United States Patent
Lai et al.

(10) Patent No.: US 9,919,417 B2
(45) Date of Patent: Mar. 20, 2018

(54) DIRECTION-ADJUSTABLE JIG

(71) Applicant: CONCRAFT HOLDING CO., LTD., Grand Cayman (KY)

(72) Inventors: Shih-Chia Lai, Grand Cayman (KY); Chin-Hsing Lee, Grand Cayman (KY); Tong Su, Grand Cayman (KY); Jie Wu, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 150 days.

(21) Appl. No.: 14/719,871

(22) Filed: May 22, 2015

(65) Prior Publication Data
US 2016/0144515 A1    May 26, 2016

(30) Foreign Application Priority Data

Nov. 26, 2014    (TW) .............................. 103220966 U

(51) Int. Cl.
*B25J 9/10*    (2006.01)
*B25J 17/00*    (2006.01)
*B25B 11/00*    (2006.01)

(52) U.S. Cl.
CPC .............. *B25J 9/109* (2013.01); *B25B 11/005* (2013.01); *B25J 17/00* (2013.01); *Y10S 901/29* (2013.01)

(58) Field of Classification Search
CPC ...... B25J 9/1687; B25J 17/0283; B25J 9/109; B25J 11/005; B25J 17/00; F16H 21/44
USPC ........... 74/99 R, 102, 103, 104, 107, 490.01; 269/233, 21; 414/648, 649, 758, 760, 414/782, 710, 743; 16/361; 294/183, 294/186
See application file for complete search history.

(56) References Cited

U.S. PATENT DOCUMENTS

| | | | | |
|---|---|---|---|---|
| 2,143,537 A | * | 1/1939 | Bliss ....................... | G01F 23/34 235/94 R |
| 2,269,680 A | * | 1/1942 | Naab ........................ | F16C 5/00 384/11 |
| 3,081,815 A | * | 3/1963 | Toensing .............. | B65C 9/1826 156/521 |
| 3,147,004 A | * | 9/1964 | Blatt ....................... | B23Q 3/08 269/233 |
| 4,396,183 A | * | 8/1983 | Lymburner ............. | B25B 5/122 269/228 |

(Continued)

FOREIGN PATENT DOCUMENTS

EP    1 442 819    *    8/2004

*Primary Examiner* — William C Joyce
(74) *Attorney, Agent, or Firm* — Rabin & Berdo, P.C.

(57) ABSTRACT

A direction-adjustable jig is capable of translating an artifact between two mutually perpendicular planes in a three-dimensional space. The jig includes a base, a sliding member, and a hinge member. The base has a pair of side walls each having a first guiding portion. The first guiding portion has a lower guiding portion and an upper guiding portion in communication with each other. The lower guiding portion and the upper guiding portion are formed at different height vertically. The sliding member is disposed reciprocatingly on the base and in between the side walls. The hinge member is pivotally connected to the sliding member and has a pair of second guiding portions for engaging the first guiding portions. The reciprocating motion of the sliding member allows the hinge member to rotate above the base and change its direction.

18 Claims, 6 Drawing Sheets

(56) References Cited

U.S. PATENT DOCUMENTS

| | | | | |
|---|---|---|---|---|
| 4,397,544 A * | 8/1983 | Yajima | .................. | G03B 27/526 |
| | | | | 355/58 |
| 4,485,685 A * | 12/1984 | Bond | .................. | B65G 47/904 |
| | | | | 74/103 |
| 4,593,573 A * | 6/1986 | Bond | ...................... | F16H 21/28 |
| | | | | 74/104 |
| 4,636,126 A * | 1/1987 | Spotts | .................. | H05K 13/043 |
| | | | | 221/171 |
| 4,706,511 A * | 11/1987 | Houston | ................. | F16H 21/44 |
| | | | | 74/102 |
| 5,141,388 A * | 8/1992 | Georgitsis | ............ | B65G 47/252 |
| | | | | 414/728 |
| 6,269,521 B1 * | 8/2001 | Gabel | ..................... | E05D 3/145 |
| | | | | 16/287 |
| 7,201,073 B2 * | 4/2007 | Ishikawa | .................. | B23Q 1/32 |
| | | | | 384/45 |
| 8,108,971 B2 * | 2/2012 | Florek | ...................... | E05D 1/04 |
| | | | | 16/193 |

* cited by examiner

DIRECTION-ADJUSTABLE JIG

CROSS-REFERENCES TO RELATED APPLICATIONS

This non-provisional application claims priority under 35 U.S.C. § 119(a) on Patent Application No. 103220966 filed in Taiwan, R.O.C. on 2014 Nov. 26, the entire contents of which are hereby incorporated by reference.

BACKGROUND

Technical Field

The instant disclosure relates to a jig, in particular for a robotic arm in which the jig is capable of translating an artifact between two mutually perpendicular planes in a three-dimensional (3-D) space.

Related Art

Automated equipment is primarily used for reducing manufacturing time and enhancing production efficiency. Typically, to reduce equipment cost, a robotic arm is employed to operate with a jig.

Most jigs are only capable of moving an artifact in a single plane or along a single axis. For rotational motion, a robotic arm is needed to achieve the operation.

For automated equipment, a robot arm is usually furnished with a gripper to pick up artifacts. However, the gripper normally is rotatable only in a single plane. If the gripper is made to operate multi-dimensionally, the cost of the automated equipment would increase with added burden to the user, although the production efficiency could be improved.

In light of this, for using with a robotic arm, how to provide a jig that is capable of manipulating between two mutually perpendicular planes, is the main objective of the instant disclosure.

SUMMARY

To achieve this objective, a direction-adjustable jig is provided by the instant disclosure. The jig comprises a base, a sliding member, and a hinge member. The base is formed with a pair of side walls extending upwardly from opposite sides thereof. Each side wall has a first guiding portion, and the first guiding portion is formed with an upper guiding portion and a lower guiding portion in communication with each other. The sliding member is movably disposed on the base and capable of reciprocating motion. The hinge member is pivotally connected to the sliding member and formed with a pair of second guiding portions on opposite sides thereof, in correspondence to the first guiding portions of the base.

Bounded by the two side walls, the sliding member can be moved reciprocatingly on the base. The reciprocating motion, in conjunction with the inter-guiding effect from the upper and lower guiding portions, allows the hinge member to rotate and achieve a change in direction on the base.

Each first guiding portion is formed penetratingly from an outer surface to an inner surface of the corresponding side wall. Each of the second guiding portions of the hinge member is formed extendingly in a direction toward the corresponding side wall of the base. Each of the second guiding portions is further received by the corresponding first guiding portion.

The sliding member is formed with a protrusion, with the protrusion being pivotally connected by one end of the hinge member. For the end of the hinge member connecting pivotally to the protrusion, a pair of joint portions is formed extendingly thereon. The two joint portions mutually define a recess for pivotally receiving the protrusion.

The joint portions and the protrusion are aligned co-axially, but do not include the first guiding portion. Such an arrangement enables the hinge member to achieve a change in direction on the base.

For the hinge member, one end thereof opposite to the joint portions has a receiving surface for securing an artifact. The receiving surface is formed with a thru hole, which is utilized to suck the artifact. Consequently, by rotating the hinge member on the base, the artifact can be oriented at different directions.

The receiving surface of the hinge member further has a tab projecting outwardly. The thru hole is formed on the tab to secure the artifact.

DETAILED DESCRIPTION

Figure 1:
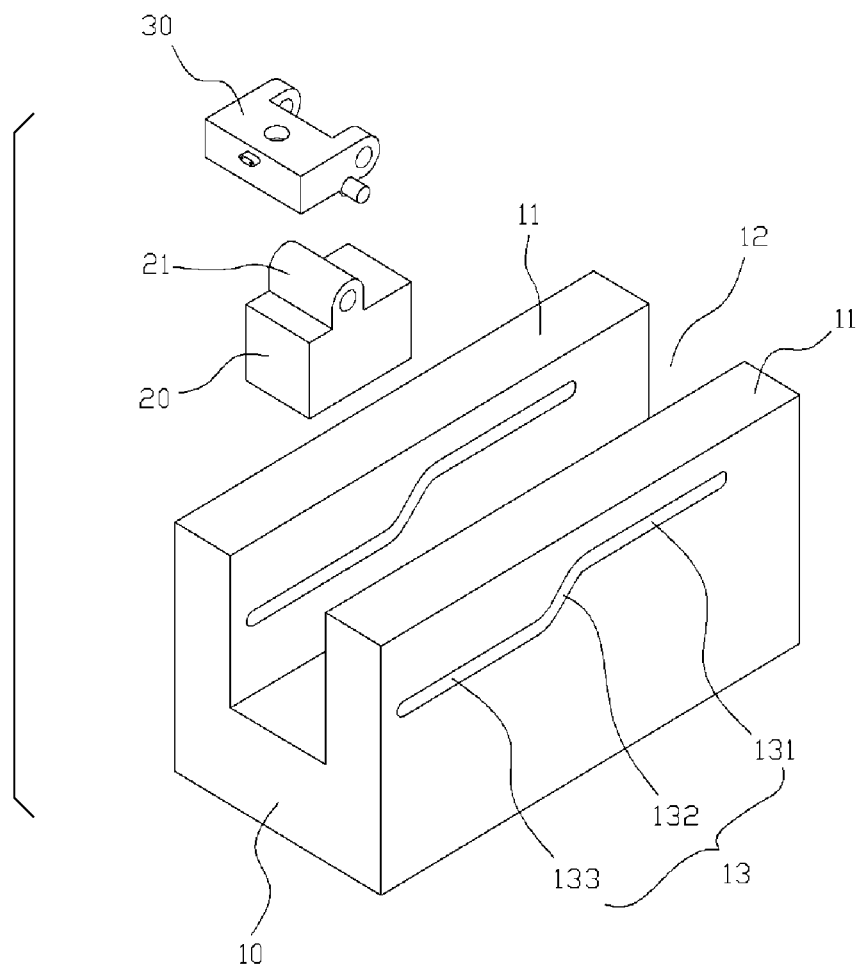
FIG. 1 is an exploded view of the instant disclosure.
Figure 2:
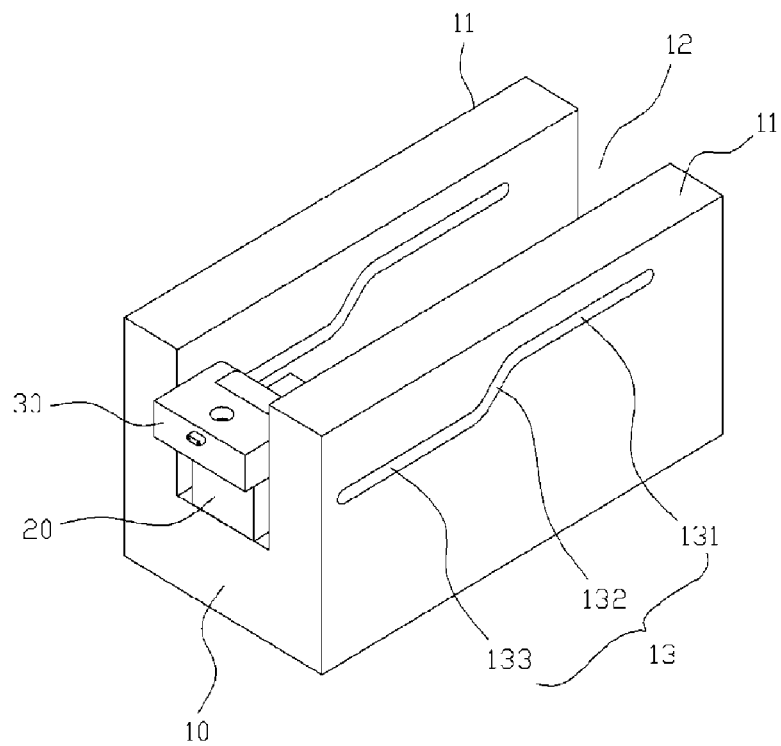
FIG. 2 is a perspective view of the instant disclosure.

FIGS. 1 and 2 show a jig of the instant disclosure. The jig is capable of changing the direction of an artifact in a three-dimensional (3-D) space, such that the artifact can be translated between two mutually perpendicular planes. The jig comprises a base 10, a sliding member 20, and a hinge member 30.

A side wall 11 is extended upwardly from each of the two sides of the base 10. The two side walls 11 further define a slot 12 therebetween. Each side wall 11 is formed with a first guiding portion 13. The first guiding portion 13 is divided into an upper guiding portion 131 and a lower guiding portion 133 in communication with each other. The upper and lower guiding portions 131 and 133 are formed at different vertical heights. An intermediate portion 132 is formed between the upper and lower guiding portions 131 and 133. For the present embodiment, each of the first guiding portions 13 is formed penetratingly on the corresponding side wall 11, but is not restricted thereto in practical use.

The sliding member 20 is slidably disposed on the base 10 and capable of reciprocating in the slot 12 formed by the sidewalls 11. For the present embodiment, the sliding member 20 has a protrusion 21 extendingly upwardly.

Figure 3:
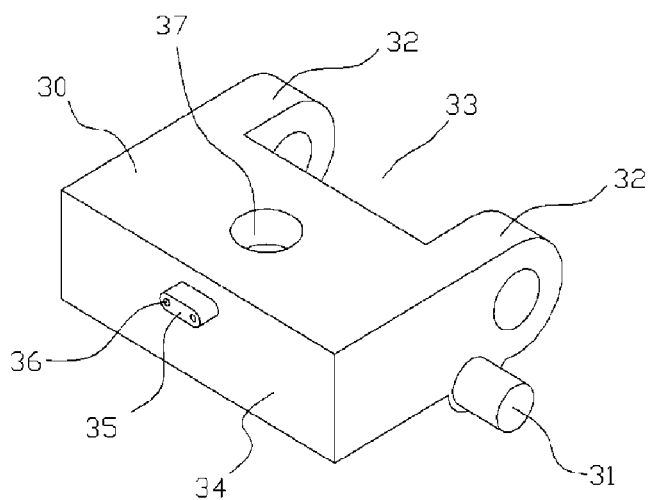
FIG. 3 is a perspective view of a hinge member of the instant disclosure.

Please refer to FIG. 3 for the hinge member 30. One end of the hinge member 30 is pivotally connected to the sliding member 20. A second guiding portion 31 is formed on each of the opposite sides of the hinge member 30 in an inter-guiding relationship with the corresponding first guiding portion 13 of the sidewall 11. For the present embodiment, each second guiding portion 31 is formed extendingly from the hinge member 30 toward the corresponding side wall 11. Each second guiding portion 31 is then received by the corresponding first guiding portion 13. For the end of the hinge member 30 pivotally connected to the sliding member 20, a pair of joint portions 32 is formed thereon. The two joint portions 32 further define a recess 33 therebetween. The recess 33 receives the protrusion 21 of the sliding member 20 in a co-axial manner, but not with the second guiding portions 31.

For the present embodiment, one end of the hinge member 30 is pivotally connected to the protrusion 21 of the sliding member 20. A receiving surface 34 is formed on an opposite end of the hinge member 30. A tab 35 is formed extendingly from the receiving surface 34 and defines at least one thru hole 36. In practice, the thru hole 36 may be formed directly on the receiving surface 34. The tab 35 is mainly used for securing an artifact smaller in size.

Furthermore, the thru hole 36 of the receiving surface 34 may be in communication with a vacuum device or used for mounting a magnetic element (not shown). Thus, the artifact can be sucked for adhering to the tip of the tab 35. For the present embodiment, the thru hole 36 is in communication with a vacuuming device and is formed to penetrate the hinge member 30. Therefore, a suctioning hole 37 is formed on one side of the hinge member 30 for communicating with the vacuuming device. Thus, the thru hole 36 is vacuumed to create a suction force for sucking the artifact.

Figure 4A:
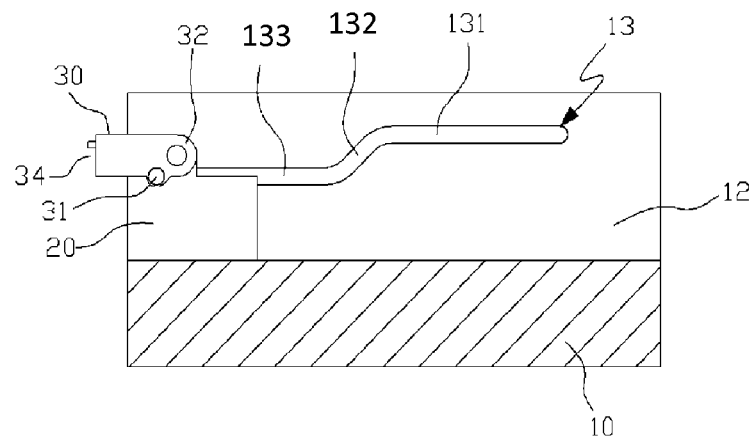
FIG. 4A-4E are schematic views of the operation of the instant disclosure.
Figure 4B:
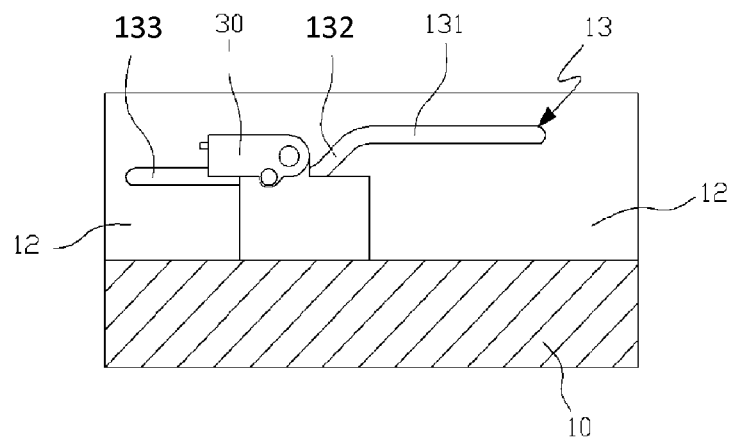

Please refer to FIGS. 4A~4E, which illustrate the operation of the jig of the instant disclosure. As shown in FIG. 4A, when the sliding member 30 is arranged at the end of the lower guiding portions 133 of the first guiding portions 13, the hinge member 30 is laid flatly on the sliding member 20. The receiving surface 34 of the hinge member 30 also protrudes beyond the base 10. In FIG. 4B, when the sliding member 20 in the slot 12 is moving toward the upper guiding portions 131, the second guiding portions 31 of the hinge member 30 also moves from the lower guiding portions 133 toward the upper guiding portions 131. In such a position, the hinge member 30 remains at the horizontal position as in FIG. 4A.

Figure 4C:
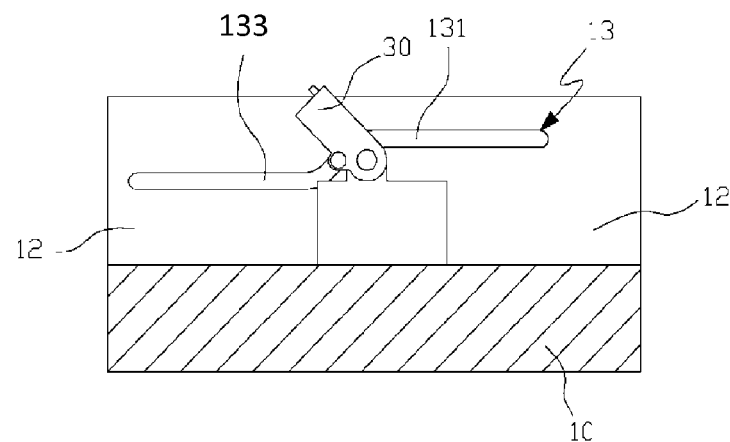
Figure 4D:
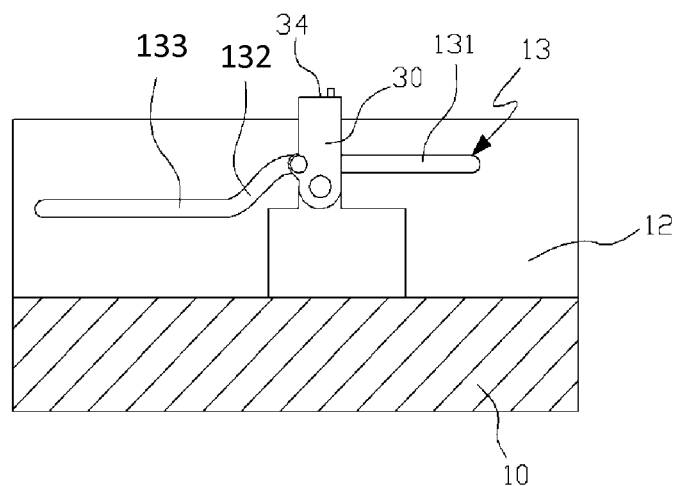
Figure 4E:
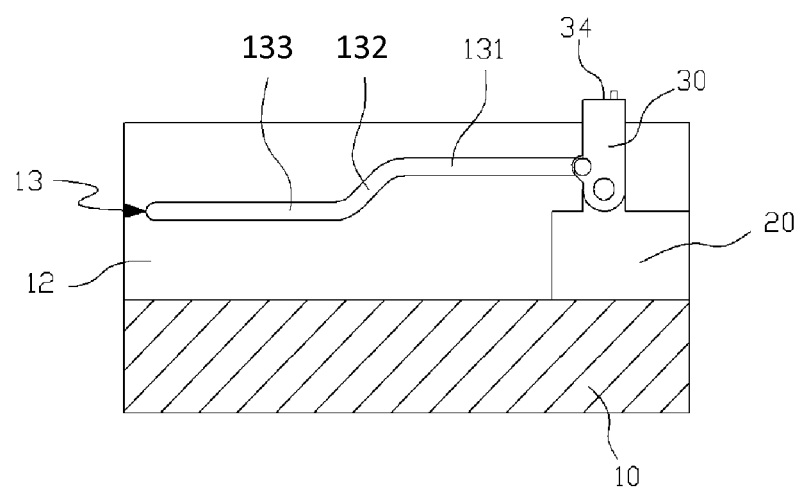

As the sliding member 20 continues to move toward the upper guiding portions 131, the second guiding portions 31 of the hinge member 30 are guided into the intermediate portions 132 of the first guiding portions 13. Because the second guiding portions 31 and the joint portions 32 are not aligned co-axially, the hinge member 30 will start to rotate on top of the sliding member 20 by pivoting about the joint portions 32. The rotation is completed when the second guiding portions 31 have reached the upper guiding portions 131. The resulting hinge member 30 is oriented vertically on the sliding member 20. The above description is illustrated in FIGS. 4C~4E.

Thus, based on the reciprocating motion of the sliding member 20 on the base 10, the hinge member 30 is allowed to rotate in changing the direction that the receiving surface 34 faces.

Figure 5:
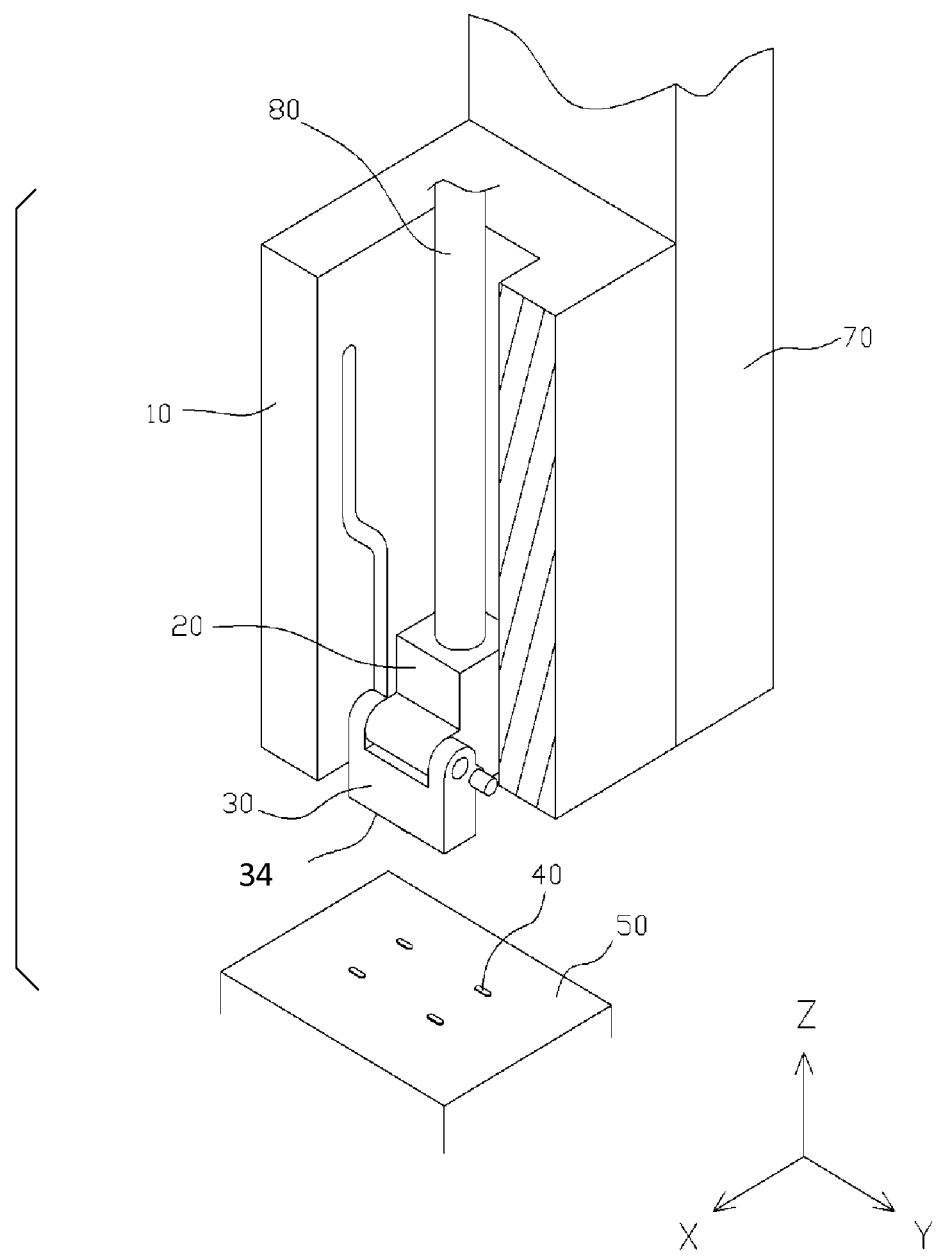
FIG. 5 is a schematic view of the instant disclosure being utilized in the XY plane.
Figure 6:
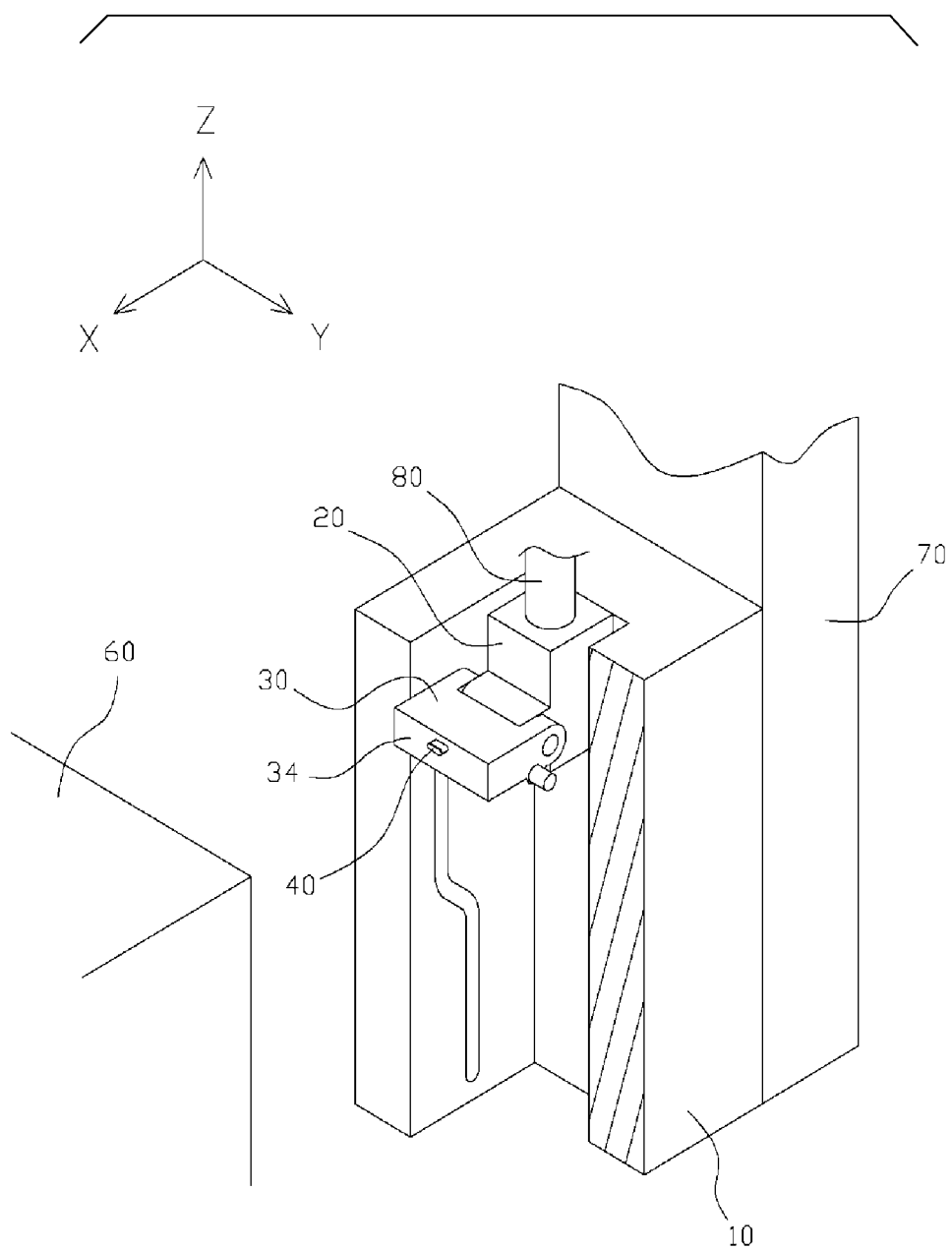
FIG. 6 is a schematic view of the instant disclosure being utilized in the YZ plane.

Please refer to FIGS. 5 and 6. The jig of the instant disclosure can be used in a 3-D space for translating an artifact 40 between two mutually perpendicular planes. One of the planes is the x-y plane, and the other plane is the y-z plane. Correspondingly, a first support table 50 is disposed in the x-y plane, and a second support table 60 is disposed in the y-z plane.

The base 10 can further be disposed on a motioning apparatus 70, such as a robotic arm or other device, which can move in a 3-D space. The goal is to allow the base 10 to travel in the 3-D space via the motioning apparatus 70. The sliding member 20 can further be driven by a reciprocating device 80. The reciprocating device 80 may be gas operated, hydraulic operated, or operated by other means to achieve reciprocating motion. By being driven by the reciprocating device 80, the sliding member 20 is motion-enabled on the base 10.

When the artifact 40 is disposed on the first support table 50 in the x-y plane, the base 10 is perpendicular to the x-y plane. To translate the artifact 40 from the x-y plane to the y-z plane, first, the base 10 is moved to be above the first support table 50 by the motioning apparatus 70. The sliding member 20 is pushed simultaneously by the reciprocating device 80, so that the hinge member 30 is parallel to the base 10, and the receiving surface 34 of the hinge member 30 is protrudingly exposed from one side of the base 10 and adjacent to the first support table 50. Once the receiving surface 34 of the hinge member 30 is aligned with and above the artifact 40, the base 10 is moved toward the first support table 50 by the motioning apparatus 70. After the receiving surface 34 of the hinge member 30 is in contact with the artifact 40, the artifact 40 is held to the receiving surface 34 of the hinge member 30 by suctioning. The base 10 is then moved away in removing the artifact 40 from the first support table 50.

Next, the motioning apparatus 70 and the reciprocating device 80 are reused, in order to move the base 10 and allow the sliding member 20 to traverse on the base 10 simultaneously. The operation brings the hinge member 30 to be perpendicular to the base 10, with the receiving surface 34 oriented in the y-z plane. In other words, the artifact 40 is translated into the y-z plane. The base 10 is then moved toward the second support table 60 to unload the artifact 40. Once the artifact 40 is received by the second support table 60, the base 10 is moved away to disengage the hinge member 30 from the artifact 40. Thus, the jig of the instant disclosure allows the artifact 40 to be translated in the 3-D space.

In comparison with known technology, the jig of the instant disclosure is structurally simple and applicable to automated equipment, such that the artifact can be translated in a 3-D space, while achieving the purpose of reducing equipment costs.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A direction-adjustable jig, comprising:
    a base having a sidewall extending upwardly from each of the two opposite sides thereof, each sidewall having a first guiding portion which has a lower guiding portion and an upper guiding portion in communication with each other, the lower guiding portion and the upper guiding portion being formed at different heights vertically;
    a sliding member disposed on the base and between two side walls, the sliding member being capable of reciprocatingly sliding on the base; and
    a hinge member having one end pivotally connected to the sliding member, and a second guiding portion being formed on each of the two opposite sides of the hinge member for inter-guiding with the corresponding first guiding portion,
    wherein, one end of the hinge member is pivotally connected to the sliding member, and a receiving surface, which defines at least one thru hole, is formed on an opposite end of the hinge member opposite to the end of the hinge member pivotally connected to the sliding member, and wherein, a tab is projected outwardly from the receiving surface of the hinge member, and the thru hole is formed on the tab for sucking an artifact.

2. The direction-adjustable jig of claim 1, wherein each first guiding portion is formed inwardly on the corresponding side wall.

3. The direction-adjustable jig of claim 2, wherein each first guiding portion is formed penetratingly on the corresponding side wall.

4. The direction-adjustable jig of claim 2, wherein each second guiding portion extends from the hinge member toward the corresponding side wall of the base and is received by the corresponding first guiding portion.

5. The direction-adjustable jig of claim 1, wherein the sliding member has a protrusion pivotally connected by one end of the hinge member.

6. The direction-adjustable jig of claim 5, wherein a pair of joint portions is formed outwardly on the end of the hinge member for pivotally connecting to the protrusion.

7. The direction-adjustable jig of claim 6, wherein a recess is formed between the joint portions, and wherein the protrusion is received by the recess and pivotally connects with the joint portions.

8. The direction-adjustable jig of claim 7, wherein the joint portions are co-axially aligned with the protrusion and non-aligned with the second guiding portions.

9. A direction-adjustable jig, comprising:
a base having two opposite sides and having one sidewall extending upwardly from each of the two opposite sides, each sidewall having a first guiding portion which has a lower guiding portion and an upper guiding portion formed at different heights vertically and in communication with each other, and an intermediate portion provided between the upper and lower guiding portions;
a sliding member disposed on the base between the two side walls, the sliding member being capable of reciprocatingly sliding on the base; and
a hinge member having two opposite sides and having one end pivotally connected to the sliding member, and a second guiding portion being formed on each of the two opposite sides of the hinge member for inter-guiding with the corresponding first guiding portion,
wherein, one end of the hinge member is pivotally connected to the sliding member, and a receiving surface, which defines at least one thru hole for sucking an artifact, is formed on an opposite end of the hinge member opposite to the end of the hinge member pivotally connected to the sliding member, wherein, when the second guiding portion moves along the lower guiding portion, the hinge member remains at a horizontal position and is laid flatly on the sliding member, wherein, when the second guiding portion moves along the intermediate portion from the lower guiding portion toward the upper guiding portion, the hinge member rotates on the sliding member, and wherein, when the second guiding portion reaches the upper guiding portion, the rotation of the hinge member is completed, and the hinge member is oriented vertically on the sliding member.

10. The direction-adjustable jig of claim 9, wherein each of the first guiding portions is formed inwardly on the corresponding side wall.

11. The direction-adjustable jig of claim 10, wherein each of the first guiding portions is formed penetratingly on the corresponding side wall.

12. The direction-adjustable jig of claim 10, wherein each of the second guiding portion extends from the hinge member toward the corresponding side wall of the base and is received by the corresponding first guiding portion.

13. The direction-adjustable jig of claim 9, wherein the sliding member has a protrusion pivotally connected by one end of the hinge member.

14. The direction-adjustable jig of claim 13, wherein a pair of joint portions is formed outwardly on the end of the hinge member for pivotally connecting to the protrusion.

15. The direction-adjustable jig of claim 14, wherein a recess is formed between the joint portions, and wherein the protrusion is received by the recess and pivotally connects with the joint portions.

16. The direction-adjustable jig of claim 15, wherein the joint portions are co-axially aligned with the protrusion and non-aligned with the second guiding portions.

17. The direction-adjustable jig of claim 9, wherein one end of the hinge member is pivotally connected to the sliding member, and wherein a receiving surface through which is defined at least one thru hole is formed on an opposite end of the hinge member.

18. The direction-adjustable jig of claim 17, wherein the receiving surface of the hinge member has a tab that projects outwardly therefrom, and wherein the thru hole is defined in the tab.

* * * * *